United States Patent
Chen et al.

(10) Patent No.: US 12,347,189 B2
(45) Date of Patent: Jul. 1, 2025

(54) METHOD FOR EXTRACTING FOREST PARAMETERS OF WETLAND WITH HIGH CANOPY DENSITY BASED ON CONSUMER-GRADE UAV IMAGE

(71) Applicant: Nanjing Forestry University, Nanjing (CN)

(72) Inventors: Jianyu Chen, Nanjing (CN); Haibo Hu, Nanjing (CN); Weibo Shi, Nanjing (CN); Ziyi Zhu, Nanjing (CN)

(73) Assignee: Nanjing Forestry University, Nanjing (CN)

( * ) Notice: Subject to any disclaimer, the term of this patent is extended or adjusted under 35 U.S.C. 154(b) by 95 days.

(21) Appl. No.: 18/388,327

(22) Filed: Nov. 9, 2023

(65) Prior Publication Data

US 2024/0290089 A1    Aug. 29, 2024

(30) Foreign Application Priority Data

Nov. 9, 2022    (CN) .......................... 202211401906.5

(51) Int. Cl.
| | | |
|---|---|---|
| G06V 20/10 | (2022.01) | |
| G06T 5/20 | (2006.01) | |
| G06T 5/50 | (2006.01) | |
| G06T 7/12 | (2017.01) | |
| G06V 10/764 | (2022.01) | |
| G06V 20/17 | (2022.01) | |

(52) U.S. Cl.
CPC .............. *G06V 20/188* (2022.01); *G06T 5/20* (2013.01); *G06T 5/50* (2013.01); *G06T 7/12* (2017.01); *G06V 10/764* (2022.01); *G06V 20/17* (2022.01); *G06T 2207/20221* (2013.01)

(58) Field of Classification Search
None
See application file for complete search history.

(56) References Cited

U.S. PATENT DOCUMENTS

2023/0039554 A1*    2/2023    Chen ................... G06V 10/764

OTHER PUBLICATIONS

Marcel Török et al. How much open water do waterbirds have in the Banat Plain? The first permanent inland water bodies inventory at 10-m resolution using Sentinel-2 imagery at regionalâscale. (Year: 2019).*

(Continued)

*Primary Examiner* — Clifford Hilaire
(74) *Attorney, Agent, or Firm* — Sage Patent Group

(57) ABSTRACT

A method for extracting forest parameters of a wetland with high canopy density based on a consumer-grade unmanned aerial vehicle (UAV) image is provided, which belongs to the technical field of wetland forest investigation. The method includes: collecting image data using a consumer-grade UAV; processing the collected UAV image, and generating a digital surface model and a digital orthophoto map; performing land use classification based on a UAV DOM image; obtaining a canopy height model with an accurate elevation based on classification of different land types of the wetland, and obtaining an accurate tree height and a tree number by means of a neighborhood extraction tool through the canopy height model; and obtaining an accurate canopy range by means of a multi-foreground marker watershed algorithm based on image filtering.

4 Claims, 13 Drawing Sheets

(56) References Cited

OTHER PUBLICATIONS

Husson E, Ecke F, Reese H. Comparison of manual mapping and automated object-based image analysis of non-submerged aquatic vegetation from very-high-resolution UAS images. Remote Sensing. Sep. 1, 2016;8(9):724. (Year: 2016).*

Lang MW, Kim V, McCarty GW, Li X, Yeo IY, Huang C, Du L. Improved detection of inundation below the forest canopy using normalized LiDAR intensity data. Remote Sensing. Feb. 21, 2020;12(4):707. (Year: 2020).*

Yang, L., Mansaray, L. R., Huang, J., & Wang, L. (2019). Optimal segmentation scale parameter, feature subset and classification algorithm for geographic object-based crop recognition using multisource satellite imagery. Remote Sensing, 11(5), 514. (Year: 2019).*

Wan H, Tang Y, Jing L, Li H, Qiu F, Wu W. Tree species classification of forest stands using multisource remote sensing data. Remote Sensing. Jan. 4, 2021;13(1):144. (Year: 2021).*

* cited by examiner

Lab color transformation

Smoothed DOM image

Foreground markers of DOM image

Foreground markers
of elevation image

Foreground marker
fusion image

Crown segmentation

Traditional watershed plot 1

Improved watershed plot 1

Bilateral filtering plot 1

Traditional watershed
plot 2

Improved watershed
plot 2

Bilateral filtering
plot 2

METHOD FOR EXTRACTING FOREST PARAMETERS OF WETLAND WITH HIGH CANOPY DENSITY BASED ON CONSUMER-GRADE UAV IMAGE

CROSS REFERENCE TO RELATED APPLICATION

This patent application claims the benefit and priority of Chinese Patent Application No. 202211401906.5 filed with the China National Intellectual Property Administration on Nov. 9, 2022, the disclosure of which is incorporated by reference herein in its entirety as part of the present application.

TECHNICAL FIELD

The present disclosure belongs to the technical field of wetland forest resource investigation, and particularly relates to a method for extracting forest parameters of a wetland with high canopy density based on a consumer-grade unmanned aerial vehicle (UAV) image.

BACKGROUND

Wetlands have a variety of ecological functions including water conservation, microclimate regulation, protection of biodiversity, disaster prevention and mitigation, etc. Forest structural parameters of a wetland are essential for studying the growth of wetland upper vegetation. Traditional forest resource investigation is manual field tally in most cases, but it's difficult for personnel to access the wetland because of muddy surfaces or waterlog. As the UAV technology has developed in recent years, UAVs have been utilized by investigators for forest resource investigation from the periphery of forests with poor natural conditions, which simplifies the investigation process and lowers manpower costs.

At present, UAV-carried sensors, such as a visible light sensor, a multispectral sensor, a hyperspectral sensor and a lidar, are used for obtaining information about a forest land during forest resource investigation, of which the visible light sensor is the most widely used. Point cloud data of the forest land can be obtained by combining UAV visible light images and aerial triangulation processing of computer software, and generate a digital surface model (DSM). A digital orthophoto map (DOM) is generated by adding the visible light images through the DSM model. The DOM is subject to terrain classification, and indexes including a forest coverage, etc. are extracted. As for the forest land images in the DOM, a marker watershed algorithm is used for crown segmentation, and parameters including a stand crown breadth and diameter, etc. are extracted. The point cloud data is classified into vegetation point cloud data, ground point cloud data, architecture point cloud data, etc. A digital terrain model (DTM) is generated according to the separated ground point cloud data, and a difference produced by subtracting the DTM from the DSM is a canopy height model (CHM). The tree number, the height and other parameters of the forest land are obtained through a sliding window method, a neighborhood analysis, etc.

Despite a simplified process, the forest resource investigation based on UAV visible light images still has the following problems.

1. A professional mapping UAV carrying a real time kinematic (RTK) module is expensive, has high operation costs, and has high requirements for operators: accurate aerial photogrammetry for forests relies on high-accuracy spatial coordinates provided by an RTK module carried on the UAV. Such UAVs, such as the DJI Phantom 4 RTK and the DJI Matrice 300 RTK, cost tens of thousands of yuan to hundreds of thousands of yuan, which limits the widespread use of the UAVs for the forest resource investigation.

2. Low positioning accuracy of a consumer-grade UAV and water surface reflection of a wetland lead to an offset of the position of a point cloud, which leads to distortion of a DSM and a DTM: the consumer-grade UAV costs less, but has no RTK module on board. The lack of high-accuracy spatial coordinates causes errors in calculation of aerial triangulation, and anomalous light spots resulted from the strong sunlight reflection from the water surface of the wetland interferes with the aerial triangulation, so the generated DSM model and DTM model have some distortions.

3. A visible light UAV image has a single band and cannot be threshold-segmented with multispectral vegetation indices commonly used in object-oriented image classification methods:

DOMs obtained through UAV low-altitude photogrammetry typically have resolution higher than 5 cm/pixel, and a remote sensing image classification method based on spectral features of pixels is typically prone to over-segmentation. In recent years, object-based image classification algorithms have been widely applied to high-resolution satellite image classification, with excellent results. However, such algorithms involve near-infrared band based vegetation indices such as normalized difference vegetation index (NDVI) and enhanced vegetation index (EVI) mostly requiring multispectral sensor data, and the UAV visible sensors contain only red, green, and blue bands, so specific visible light vegetation indices need to be screened and classified.

4. Existing improved marker watershed algorithms for individual tree segmentation have average accuracy of segmenting high-resolution wetland vegetation with high canopy density.

Marker watershed algorithms have been widely used in the field of individual tree segmentation. Specifically, a DOM of a forest land is converted to a gray-scale image and then is segmented according to the gradient change of the image. The algorithms have an excellent effect on a forest land without high canopy density, but have lower accuracy of crown segmentation for the forest land with high canopy density because segmentation of overlapping crowns is likely to be missed. Some scholars have proposed the use of a crown vertex improved marker watershed algorithm for individual tree crown segmentation of DOM gray-scale images of a forest land with high canopy density, which has made some achievements. Since a UAV image has high resolution, a DOM has high noise, the fine texture of vegetation interferes with the accuracy of individual tree segmentation, and a large amount of color information is lost after the DOM is transformed into a gray-scale image, an unfavorable image is produced for individual tree segmentation.

SUMMARY

A technical problem solved by the present disclosure is to provide a method for extracting forest parameters of a wetland with high canopy density based on a consumer-grade unmanned aerial vehicle (UAV) image, which has low operation cost and high extraction accuracy.

In order to solve the above technical problem, the present disclosure uses the following technical solution.

A method for extracting forest parameters of a wetland with high canopy density based on a consumer-grade UAV image, including:

S1: collecting image data using a consumer-grade UAV;

S2: performing georeferencing, aerial triangulation, and generation of tie points and dense point clouds on the collected UAV image, and generating a digital surface model (DSM) and a digital orthophoto map (DOM);

S3: performing land use classification based on a UAV DOM image, and segmenting a bare land, a shadow; a water body, an aquatic plant and a pond cypress step by step;

S4: based on classification of different land types of the wetland, extracting a median of elevation points in a region, thinning the elevation points, regenerating a digital terrain model (DTM) of the wetland, obtaining a canopy height model (CHM) with an accurate elevation by subtracting the digital terrain model (DTM) from the digital surface model (DSM), and obtaining an accurate tree height and a tree number by means of a neighborhood extraction tool through the canopy height model (CHM);

S5: processing the digital orthophoto map (DOM) by bilateral filtering, fusing foreground markers by superposing tree vertices obtained from the canopy height model (CHM), introducing the foreground markers into a watershed algorithm considering objects overlapping each other, to segment the objects, exporting a segmenting boundary, and obtaining an accurate canopy range.

Further, in S1, a consumer-grade UAV DJI Mavic2 zoom is used to obtain the image data, and images with three visible light bands of red, green and blue are obtained: a route of the UAV is planned by means of DJI PILOT, and a mapping method combining fixed route photography and video is used.

Further, in S3, an optimal segmentation scale is determined through an ESP2 tool, the optimal segmentation scale, a shape factor and a compactness factor are input into eCognition Developer 9.0 for multi-scale segmentation, and the bare land, the shadow, the water body, the aquatic plant and the pond cypress are segmented step by step through a threshold segmentation tool according to a brightness, a red band and a vegetation index.

Further, in S3, accuracy of a classification result is verified through an Arcgis 10.5, wherein 200 points are randomly generated in the Arcgis 10.5 to visually interpret the classification result, and the accuracy is verified with an object-oriented classification result by means of a confusion matrix.

Further, in S4, a non-vegetation land type is extracted to generate a region of interest (ROI), the elevation points of the digital surface model (DSM) are extracted with a non-vegetation ROI and are thinned in Arcgis 10.5 to generate a triangulated irregular network (TIN), terrain raster data, that is, the digital terrain model (DTM) is exported, the canopy height model (CHM) is obtained by subtracting the digital terrain model (DTM) from the digital surface model (DSM) by means of a raster calculator, and the tree vertices are extracted by means of a neighborhood analysis tool.

Further, in S5, a multi-foreground marker watershed algorithm based on image bilateral filtering is run by means of Matlab 2018b, and a DOM image of a forest land sample with high canopy density is selected for crown segmentation; and a canopy area is calculated through the Arcgis 10.5, and accuracy is verified against a traditional marker watershed algorithm and an improved marker watershed algorithm.

Further, accuracy of crown segmentation is evaluated through a general evaluation method, and segmented crowns have five situations: match, close match, loss, under-segmentation, and over-segmentation.

Compared with the prior art, the present disclosure has the following advantages.

1. In view of the problem that cost of a professional mapping UAV carrying a real time kinematic (RTK) module is too high, a DJI Mavic 2 zoom consumer-grade UAV is used for obtaining an image of a forest land, and visible light images with a larger overlap degree are obtained by means of high-altitude oblique photography and low-altitude video. Therefore, the operation cost of the UAV is reduced, a size of image files is reduced, and a computer data processing time is saved.

2. In view of the problem of single band of a visible light UAV image, visible light vegetation indices of wetland vegetation classification are screened, and the optimal segmentation scale is determined by using a multi-scale segmentation tool ESP2 in combination with an object-oriented image classification method, to segment and classify the high-accuracy UAV image. Therefore, the shortages of high resolution and single band of a visible light sensor are made up.

3. In view of elevation anomalies in a DSM and a DTM of a wetland, a classification result of a DOM is used for extracting patches in surface such as a ground surface and a water surface in the DSM. A median of elevation points in a region is extracted, and the elevation points are thinned. The DTM of the wetland is regenerated. A CHM with an accurate elevation is obtained by subtracting the DTM from the DSM. A tree height and a tree number are accurately obtained by means of a neighborhood extraction tool through the CHM.

4. In view of the shortcomings of existing improved watershed algorithms, a multi-foreground marker watershed algorithm based on image filtering is proposed. First, the DOM is processed by bilateral filtering based on a Gaussian kernel. Foreground markers are fused by superposing tree vertices obtained from the CHM. The foreground markers are introduced into a watershed algorithm considering objects overlapping each other, to segment the objects. A segmenting boundary is exported. An accurate canopy range is obtained.

BRIEF DESCRIPTION OF THE DRAWINGS

FIG. 10A shows L*a*b* color transformation, FIG. 10B shows a DOM image smoothed by bilateral filtering, FIG. 10C shows foreground markers of the DOM image, FIG. 10D shows foreground markers of an elevation image, FIG. 10E shows foreground marked fusion image, and FIG. 10F shows crown segmentation:

DETAILED DESCRIPTION OF THE EMBODIMENTS

Figure 1:
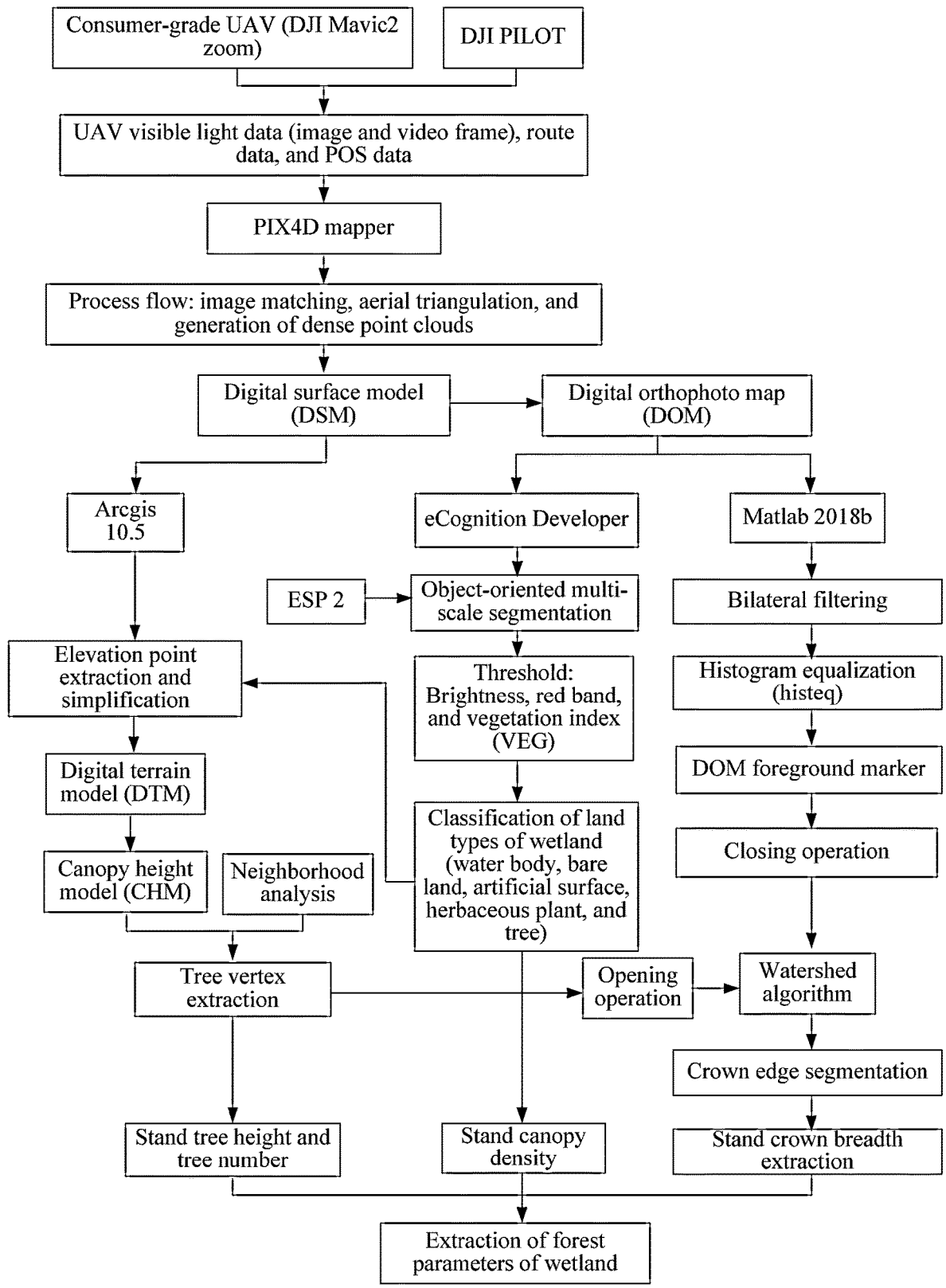
FIG. 1 shows a technology roadmap of a method according to the present disclosure.

The present disclosure is further elucidated below in conjunction with specific embodiments, and embodiments are implemented under the premise of the technical solutions of the present disclosure. It should be understood that these embodiments are provided merely to illustrate the present disclosure rather than to limit the scope of the present disclosure.

A method for extracting forest parameters of a wetland with high canopy density based on a consumer-grade unmanned aerial vehicle (UAV) image in the embodiment mainly include the following steps S1-S5.

In step S1, image data is collected using a consumer-grade UAV.

In the present disclosure, UAV visible light data is obtained by a consumer-grade UAV DJI Maciv 2 zoom. An entire machine has a weight of 905 g, a folding size of 214××84 mm (length×width×height) only, and a longest flight time (in a windless environment) of 31 minutes. A mounted visible light sensor is a 1/2.3 inch complementary metal oxide semiconductor (CMOS), which has effective pixels of 12 million, and may obtain an image with three visible light bands of red, green and blue. A collection site for the test image data in the embodiment is located in a wetland in Nanjing City, Jiangsu Province, with an area of about 1.38 hm², and a main stand is pond cypresses. A collection time was in the middle of June 2021, with clear weather and few clouds.

A route of the UAV was planned by DJI PILOT(Android). A mapping method combining fixed route photography and videography was adopted. Oblique photography was conducted at a relative flying height set as 75 m, with a gimbal lens arranged obliquely at 45°, a side overlap rate of 75%, a flight speed of 5 m/s, to collect orthographic visible light images and visible light images in four directions of north, east, south and west in a wetland range, totaling 256 images. Then a relative flying height of 40 m was set for video shooting of the site. Video resolution was gimbal default (1920×1080/24 fps), a shooting time was 2 min 34 s, and a frame extraction interval was 0.5 s, totaling 300 frames.

In step S2, georeferencing, aerial triangulation, and generation of tie points and dense point clouds are performed on the collected UAV images, and a digital surface model (DSM) and a digital orthophoto map (DOM) are generated.

Figure 3:
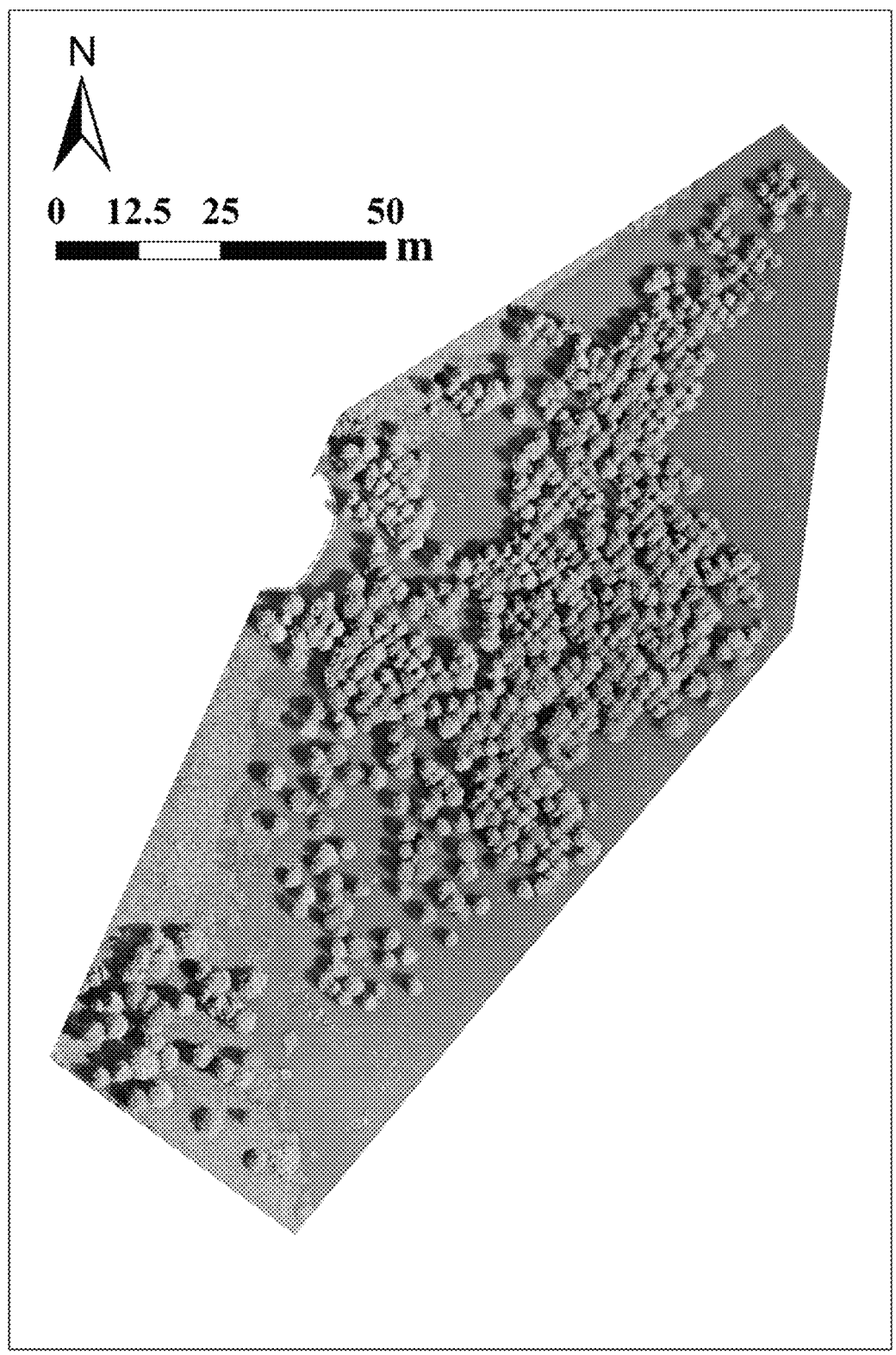
FIG. 3 is a picture showing a digital orthophoto map (DOM) according to an embodiment of the present disclosure.
Figure 4:
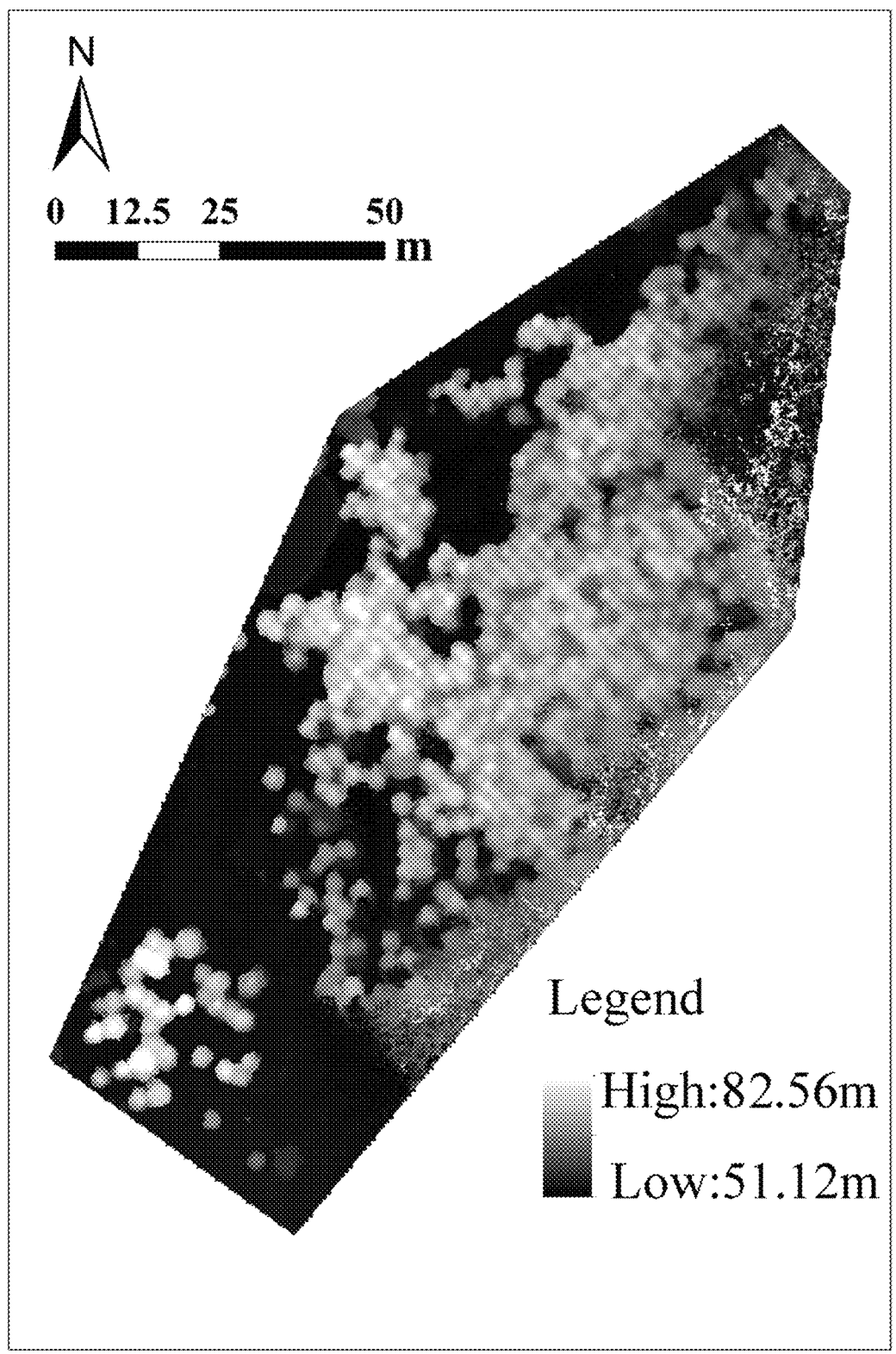
FIG. 4 is a picture showing a digital surface model (DSM) according to an embodiment of the present disclosure.
Figure 5:
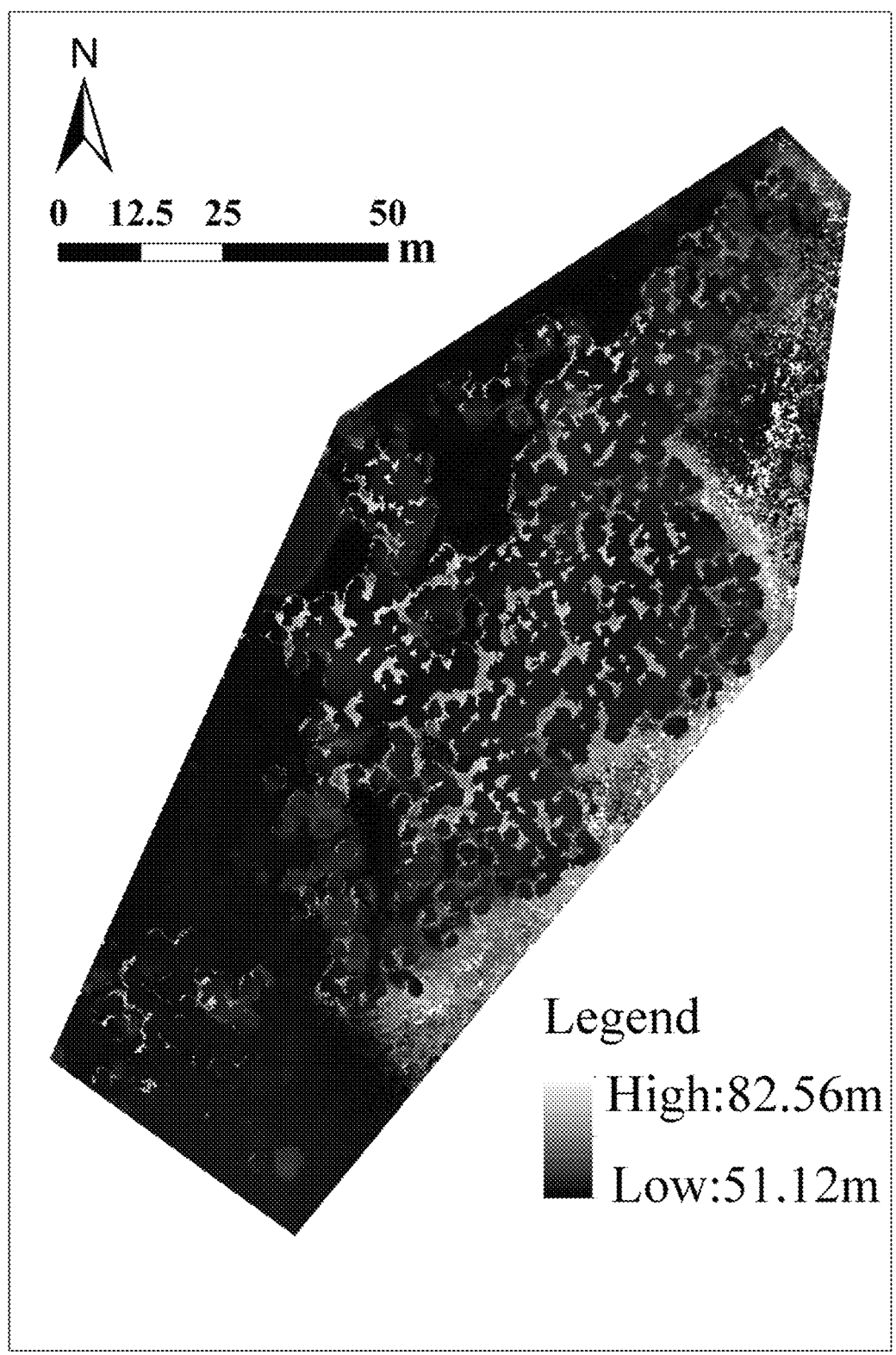
FIG. 5 is a picture showing a digital terrain model (DTM) according to an embodiment of the present disclosure.
Figure 6:
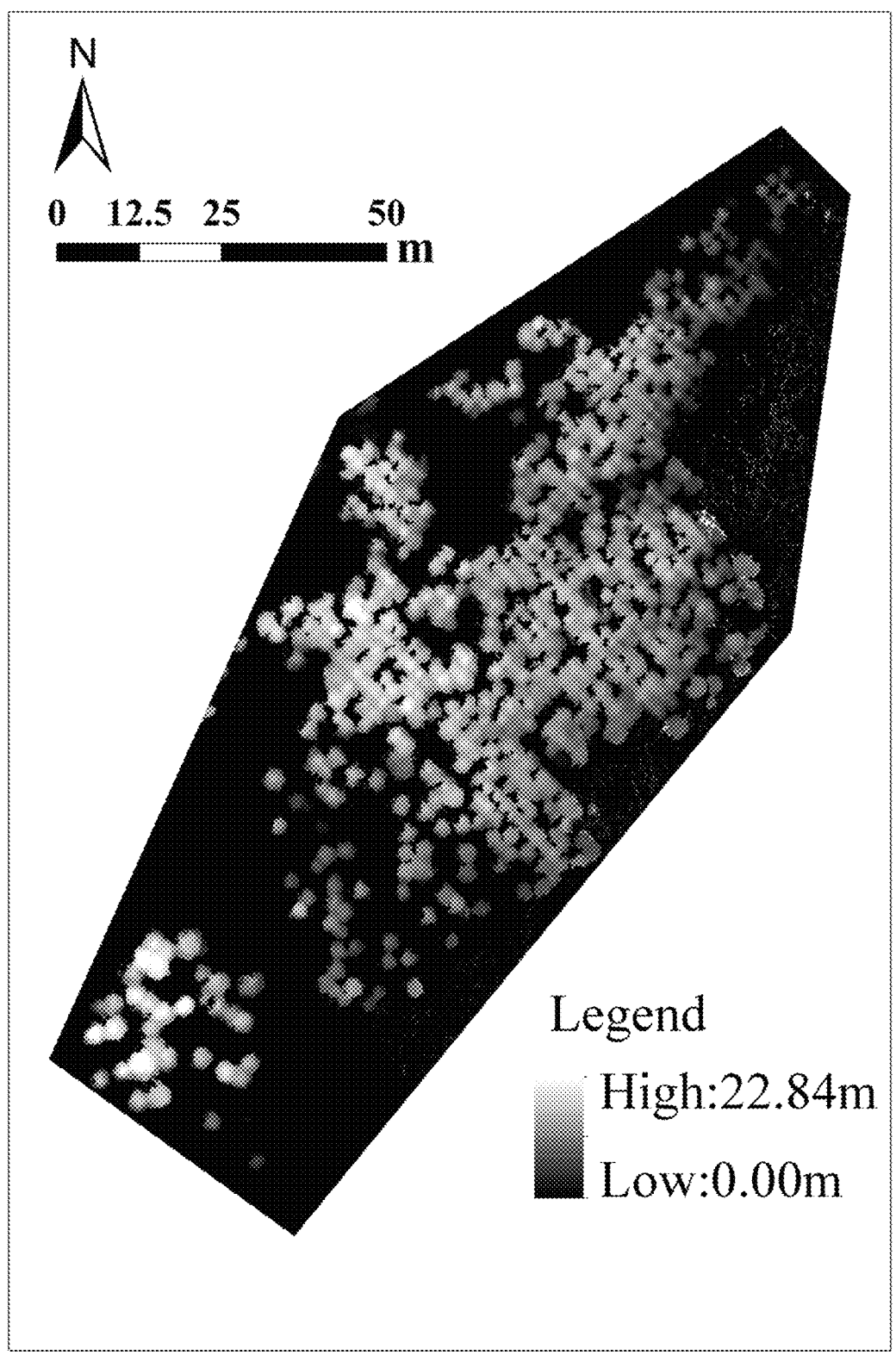
FIG. 6 is a picture showing a canopy height model (CHM) according to an embodiment of the present disclosure.

A specific process is as follows: 556 UAV images obtained in S1 are imported into a PIX4D mapper, a 3D map mode is selected to perform georeferencing, aerial triangulation, and generation of connection points and dense point clouds on photos. Then, the DSM (in FIG. 4) and the DOM (in FIG. 3) are generated. A ground sampling distance (GSD) is 3 cm/pixel.

In step S3, land use classification is performed based on a UAV DOM image. Firstly, an optimal segmentation scale is determined through an ESP2 tool, then the optimal segmentation scale, a shape factor and a compactness factor are input into eCognition Developer 9.0 for multi-scale segmentation, and finally, a bare land, a shadow, a water body, an aquatic plant and a pond cypress are segmented step by step through a threshold segmentation tool according to a brightness, a red band and a vegetation index.

Figure 2:
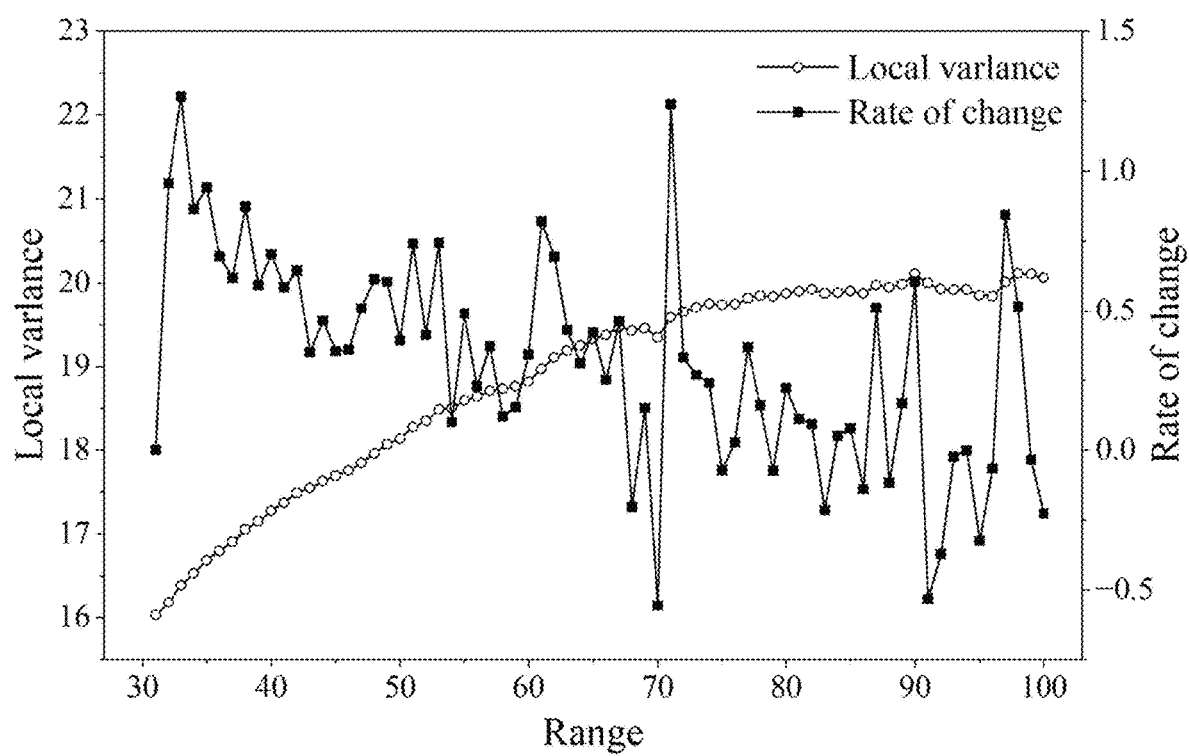
FIG. 2 shows ESP2 optimal segmentation parameters according to an embodiment of the present disclosure.
Figure 7:
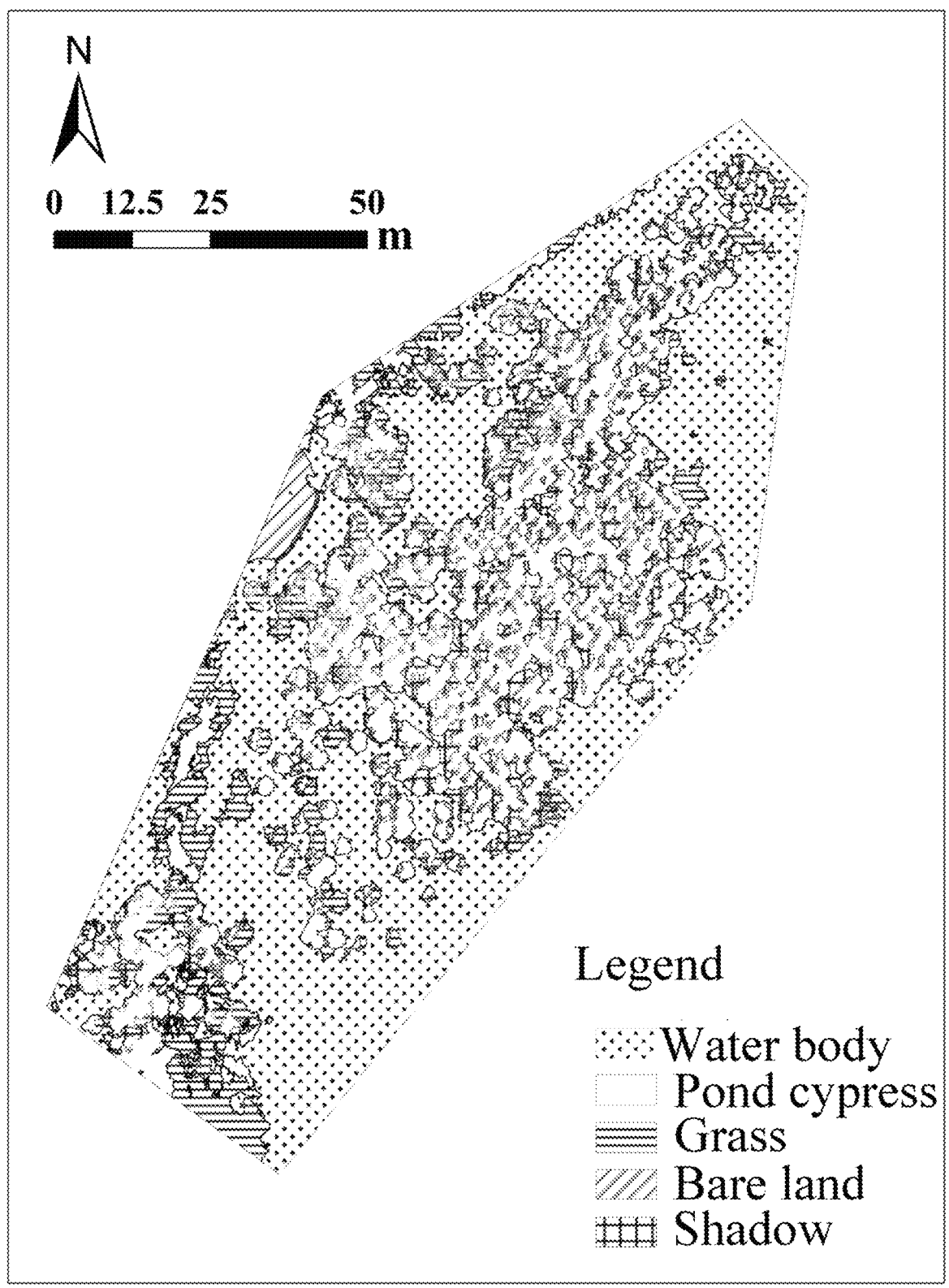
FIG. 7 shows a land use map of a wetland according to an embodiment of the present disclosure.

A specific implementation process of the embodiment is as follows: the DOM is loaded into the eCognition Developer 9.0, and the ESP 2 tool is used for determining the optimal segmentation scale (in FIG. 2). The optimal segmentation scale is 71 when the shape factor is 0.4 and the compactness factor is 0.5. According to spectral characteristics of different land types, the threshold segmentation tool is used for segmenting the bare land, the shadow, the water body, the aquatic plant and the pond cypress step by step according to the brightness, the red band and the vegetation index (VEG), and a land use map is generated (in FIG. 7).

The UAV DOM image includes three bands of a red band (abbreviated to R), a green band (abbreviated to G) and a blue band (abbreviated to B). A particular formula of the vegetation index is as follows:

$$VEG = \frac{G}{R^{0.67} \times G^{0.33}}$$

A threshold segmentation process is as follows:
(1) an image background is segmented (brightness ≥256);
(2) an artificial surface and a bare land are segmented (red band ≥195);
(3) a shadow is segmented (red band≤195);
(4) a water body is segmented (VEG*256≤292.5);
(5) an aquatic plant is segmented (292.5<VEG*256≤306.5); and
(6) a pond cypress is segmented (VEG*256>306.5).

Figure 8:
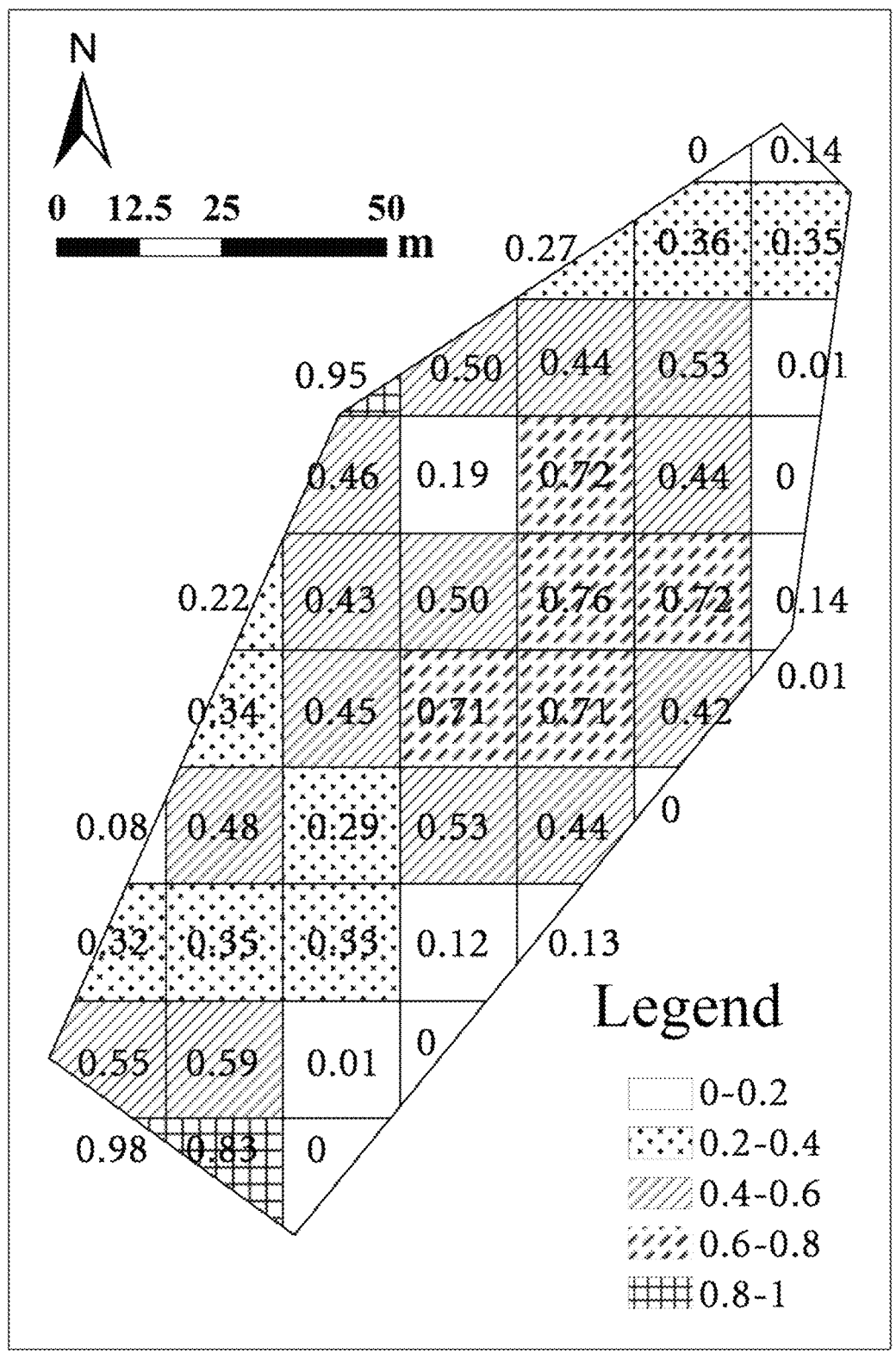
FIG. 8 shows vegetation coverage of a wetland (20 m quadrat) according to an embodiment of the present disclosure.
Figure 9:
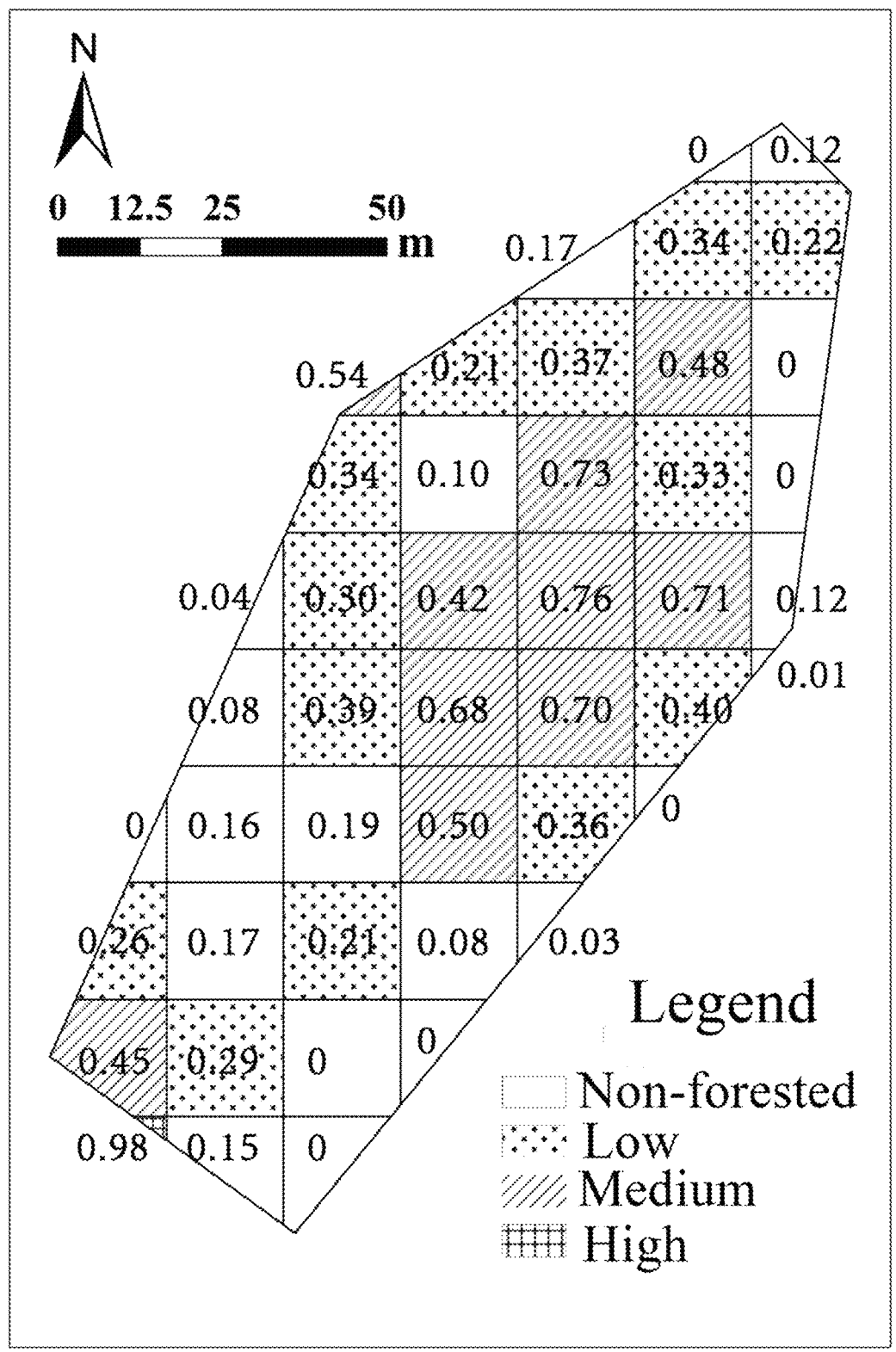
FIG. 9 shows canopy density of a wetland (20 m quadrat) according to an embodiment of the present disclosure.
Figure 10A:
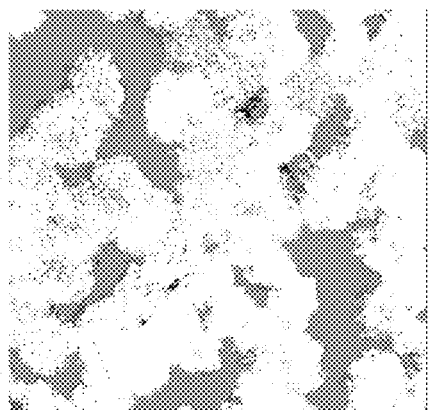
FIGS. 10A to 10F are pictures showing a flowchart of a crown segmentation algorithm according to an embodiment of the present disclosure, where
Figure 10B:
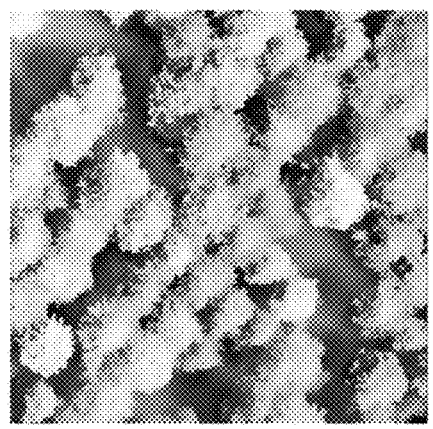
Figure 10C:
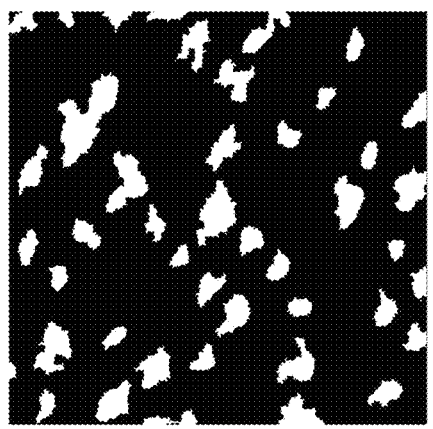
Figure 10D:
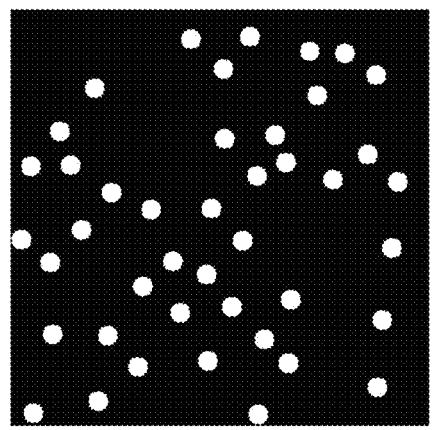
Figure 10E:
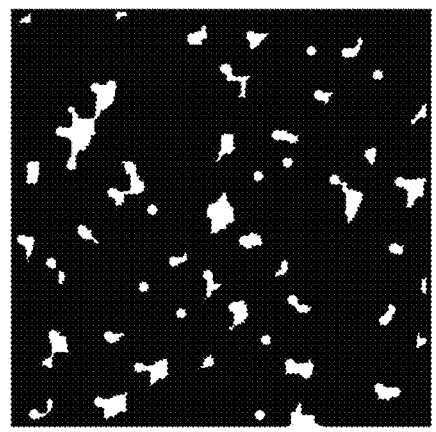
Figure 10F:
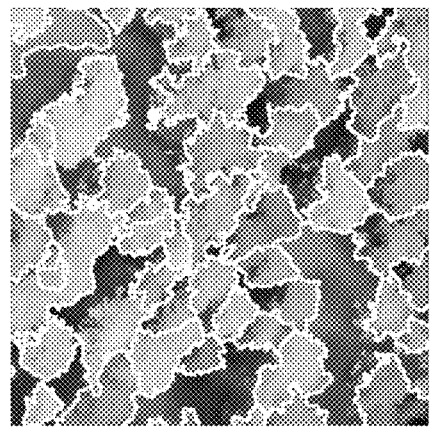
Figure 11A:
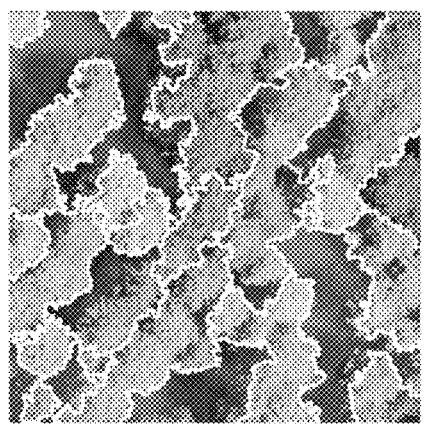
FIGS. 11A to 11C are pictures showing crown segmentation contrast of sample plot 1 according to an embodiment of the present disclosure, where FIG. 11A uses a traditional watershed algorithm, FIG. 11B uses an improved watershed algorithm, and FIG. 11C uses an algorithm of the present disclosure.
Figure 11B:
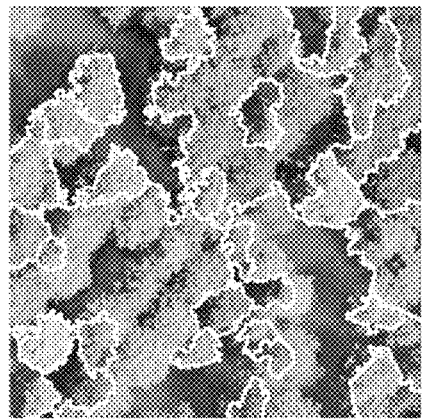
Figure 11C:
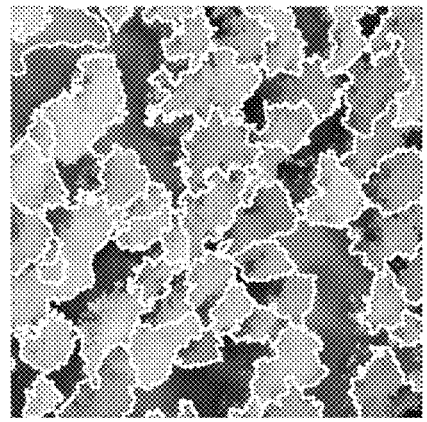
Figure 12A:
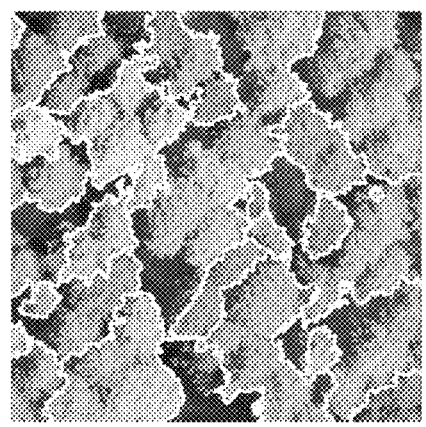
FIGS. 12A to 12C are pictures showing crown segmentation contrast of sample plot 2 according to an embodiment of the present disclosure, where FIG. 12A uses a traditional watershed algorithm, FIG. 12B uses an improved watershed algorithm, and FIG. 12C uses an algorithm of the present disclosure.
Figure 12B:
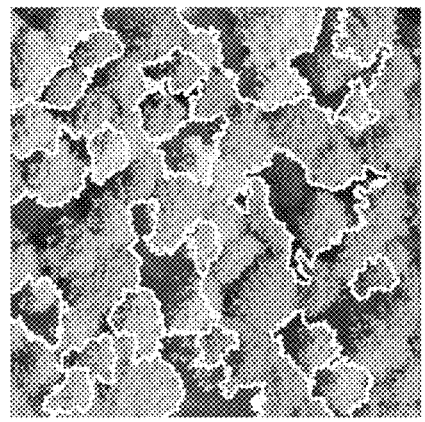
Figure 12C:
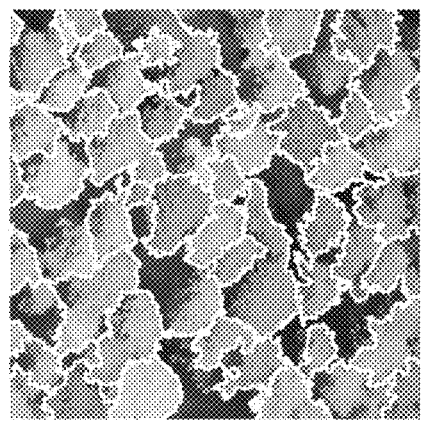

Arcgis 10.5 is used for verifying accuracy of a classification result. Specifically, 200 points are randomly generated in Arcgis 10.5 and then the classification result is visually interpreted, and the accuracy is verified with an object-oriented classification result by means of a confusion matrix. As shown in Table 1, the overall classification accuracy is 85%, Kappa accuracy is 78.6%, and user accuracy of different land types of the water body, the shadow, the artificial surface, the aquatic plant and the tree is 82.35%, 100%, 100%, 65.38% and 91.04%, respectively. Vegetation cover is composed of aquatic plants and trees. In combination with the classification accuracy of the aquatic plants and the trees, extraction accuracy of vegetation coverage is calculated as 82.98%. There is no shrub in the sample plot, and the canopy density is a ratio of a projection area of the trees to a total area. Therefore, extraction accuracy of the canopy density is 91.04%, the same as that of the tree projection area. The extraction accuracy is high. A square fishing net of 20 m is generated within the wetland area, and vegetation coverage and canopy density in each quadrat are counted by zoning (in FIGS. 8 and 9).

TABLE 1

Accuracy verification results of classification results

|  |  | Real raster data | | | | | |
| --- | --- | --- | --- | --- | --- | --- | --- |
|  | Land type | Water body | Shadow | Artificial surface | Aquatic plant | Tree | Total |
| Raster data of the method | Water body | 70 | 9 | 0 | 5 | 1 | 85 |
|  | Shadow | 0 | 17 | 0 | 0 | 0 | 17 |
|  | Artificial surface | 0 | 0 | 5 | 0 | 0 | 5 |
|  | Aquatic plant | 4 | 0 | 0 | 17 | 5 | 26 |
|  | Tree | 0 | 1 | 0 | 5 | 61 | 67 |
|  | Total | 74 | 27 | 5 | 27 | 67 | 200 |
|  | User accuracy (%) | 82.35 | 100.00 | 100.00 | 65.38 | 91.04 |  |
|  | Overall accuracy (%) | 85.00 |  |  | Kappa (%) | 78.60 |  |

In step S4, based on classification of different land types of the wetland, a median of elevation points in a region is extracted, and the elevation points are thinned, a digital terrain model (DTM) of the wetland is regenerated, a canopy height model (CHM) with an accurate elevation is obtained by subtracting the digital terrain model (DTM) from the digital surface model (DSM), and an accurate tree height and a tree number are obtained by means of a neighborhood extraction tool through the CHM.

Based on classification of different land types of the wetland, a non-vegetation land type is extracted to generate a region of interest (ROI). The elevation points of the digital surface model (DSM) are extracted with the non-vegetation ROI and are thinned in Arcgis 10.5 to generate a triangulated irregular network (TIN). Terrain raster data, that is, the digital terrain model (DTM) is exported. The canopy height model (CHM) is obtained by subtracting the digital terrain model (DTM) from the digital surface model (DSM) by means of a raster calculator. The tree vertices are extracted by means of a neighborhood analysis tool. A window is set to be "circular", and a search radius pixel is set be to "31" according to visual interpretation of a crown diameter of the pond cypress. The accuracy is verified by measuring height data of 41 trees with Nikon Forestry Pro on site. As shown in Table 2, after comparison, compared with a measured value, a root mean square error (RMSE) of the tree height extracted through the method is 0.37 m, and $R^2$ is 0.99. The method has high extraction accuracy.

TABLE 2

Comparison table of tree height extracted by UAV and measured tree height

|  | Measured value/m | Extracted value/m |
| --- | --- | --- |
| 1 | 11.20 | 11.02 |
| 2 | 12.87 | 12.93 |
| 3 | 16.80 | 16.59 |
| 4 | 12.93 | 12.84 |
| 5 | 19.73 | 19.76 |
| 6 | 11.80 | 11.69 |
| 7 | 11.13 | 11.14 |
| 8 | 12.87 | 12.76 |
| 9 | 11.27 | 11.24 |
| 10 | 8.80 | 8.9 |
| 11 | 12.00 | 11.07 |
| 12 | 12.60 | 12.7 |
| 13 | 10.13 | 10.48 |
| 14 | 10.40 | 10.43 |
| 15 | 16.80 | 16.79 |
| 16 | 14.87 | 14.71 |
| 17 | 11.95 | 11.49 |
| 18 | 14.93 | 14.76 |
| 19 | 16.20 | 15.99 |
| 20 | 12.60 | 12.64 |
| 21 | 10.33 | 10.47 |
| 22 | 13.33 | 12.84 |
| 23 | 11.53 | 10.94 |
| 24 | 13.33 | 13.36 |
| 25 | 11.60 | 11.31 |
| 26 | 12.13 | 13.24 |
| 27 | 15.53 | 15.12 |
| 28 | 11.93 | 11.67 |
| 29 | 8.27 | 8.05 |
| 30 | 8.53 | 8.1 |
| 31 | 8.20 | 7.75 |
| 32 | 12.60 | 12 |
| 33 | 7.33 | 6.93 |
| 34 | 7.73 | 7.33 |
| 35 | 8.93 | 8.62 |
| 36 | 4.93 | 4.4 |
| 37 | 8.67 | 8.27 |
| 38 | 7.73 | 7.56 |
| 39 | 6.33 | 5.9 |
| 40 | 9.20 | 9.03 |
| 41 | 5.53 | 5.4 |

In step S5, a multi-foreground marker watershed algorithm based on image filtering is proposed. First, the DOM is processed by bilateral filtering based on a Gaussian kernel. Foreground markers are fused by superposing tree vertices obtained from the CHM. The foreground markers are introduced into a watershed algorithm considering objects overlapping each other, to segment the objects. A segmenting boundary is exported. An accurate canopy range is obtained. A specific implementation process is as follows.

Based on a forest land range with high canopy, the multi-foreground marker watershed algorithm based on image bilateral filtering is run by means of Matlab 2018b. DOM images of two forest land sample plots of sample plot 1 (47 trees) and sample plot 2 (53 trees) with high canopy density are selected for crown segmentation. Arcgis 10.5 is used for calculating a canopy area, and accuracy is verified against a traditional marker watershed algorithm and an improved marker watershed algorithm.

The multi-foreground marker watershed algorithm based on color image bilateral filtering is run by means of Matlab 2018b as follows:

(1) The DOM images and tree vertex images of the sample plots are read, and geographical coordinates are written.

First, a tif file (DOM) is loaded, then a tif image file and geographic information are read separately, tif geographic information is read, and the number of rows and columns in tif are read.

(2) Color image bilateral filtering based on a Gaussian kernel is used for processing the DOM images, to remove a leaf shadow, retain leaf color, and enhance a difference between tree edges. After gray transformation, a foreground marker A is made by means of morphological opening operation, erosion and reconstruction algorithms as follows:

1) L*a*b* color transformation of an RGB image is performed.

L*a*b* color comes from a principle of human vision. Similar to human eyes, L*a*b* can evenly perceive a brightness and a color scale of an image. An RGB image can be transformed into an L*a*b* color image with a transformation principle as follows:

1. L* comes from the brightness of the RGB image and has a value in a range of [0, 100], where 0 is black, 100 is white. With increase in L*, the color becomes brighter.

2. a* comes from a red or green hue of the RGB image, a positive value corresponds to red/magenta, a negative value corresponds to green, and a* has a value in the range of [−100, 100] or [−128, 127) typically.

3. b* comes from a yellow or blue hue of the RGB image, a positive value corresponds to yellow, a negative value corresponds to blue, and b* has a value in a range of [−100, 100] or [−128, 127) typically.

2) A pure color area is boxed.

3) A variance of Euclidean distances from points in an L*a*b* color space to an origin is calculated.

A formula of the Euclidean distance is:

$$d = \sqrt{[(x_2 - x_1)^2 + (y_2 - y_1)^2]}$$

Note: d is the Euclidean distance, (x1, y1) and (x2, y2) are coordinates of two points for calculating the distance.

4) The image is filtered by bilateral filtering.
5) Saw teeth in the edge is reduced.
6) The image is displayed.
7) The image is transformed into a gray-scale image.
8) Gradients are calculated.
9) The image is subject to opening operation.
10) The image is subject to erosion.
11) Morphological reconstruction is performed.
12) A maximum value of the reconstructed region is calculated to obtain the foreground marker.
13) The image is subject to closing operation.

(3) The tree vertex images are processed by morphological algorithm, and a foreground marker B is made, where specific implementation steps are as follows:

First an elevation marker file is loaded and read, then elevation points are dilated circularly, and finally elevation foreground marking is performed.

(4) An image of the foreground marker A and an image of the foreground marker B are fused.

Firstly, the image superimposition is performed, and then a morphological erosion algorithm is used for removing saw teeth and noises in edges of a marker image.

(5) Marker watershed segmentation is performed on a fused image, and peripheries of segmented objects are set to overlap to each other.

Firstly, a background marker is calculated. Then a marker-controlled watershed algorithm with pixels connected is used.

The watershed algorithm is originated from geography. A value of a gray-scale image is regarded as a height, and a principle of collecting water in basin is used for segmenting an image. The UAV images have high resolution, and watershed segmentation directly using gradient images will lead to over-segmentation due to local irregularities such as image noise and gradients. To solve the problem, external information can be introduced to limit the over-segmentation of images, that is, the marker-controlled watershed algorithm. According to the method, a marked image is formed by fusing a tree top and a crown range, such that over-segmentation can be effectively controlled. Moreover, as for the situation of crown overlap, pixels are connected in vertical, horizontal and diagonal directions.

(6) A range of non-tree land types is subtracted from the segmentation boundary, to output a crown segmentation boundary.

Firstly, segmentation boundary assignment is performed, then a storage location and a storage name of a watershed image are determined, and the watershed image is stored.

Contents of accuracy verification are as follows.

The accuracy of crown segmentation is evaluated through a general evaluation method, and segmented crowns have five situations: match, close match, loss, under-segmentation, and over-segmentation. Match means that an extracted crown area and an actual crown area account for more than 80% separately. Close match means that an overlapping area between the extracted crown area and the actual crown area accounts for more than 80% of one of the extracted crown area and the actual crown area. Loss means that a ratio of the extracted crown area to the actual crown area is less than 50%. Under-segmentation means that a plurality of true tree crowns are regarded as one tree crown. Over-segmentation means that one real tree crown is segmented into a plurality of tree crowns. Accuracy of individual-tree crown breadth recognition is expressed by a sum of two values of match and close match. Accuracy comparison is shown in the table below. Extraction accuracy of the method is 74.97%, which is much higher than 13.1% of the traditional watershed algorithm and 28.58% of the improved watershed algorithm.

TABLE 3

Comparison table of crown segmentation accuracy

| Method | Sample plot | Match/% | Close match/% | Loss/% | Under-segmentation/% | Over-segmentation/% | Total/% |
|---|---|---|---|---|---|---|---|
| Traditional watershed algorithm | 1 | 12.77% | 2.13% | 14.89% | 70.21% | 0.00% | 100% |
|  | 2 | 7.55% | 3.77% | 13.21% | 73.58% | 1.89% | 100% |
|  | Extraction accuracy: 13.1% | | | | | | |

TABLE 3-continued

Comparison table of crown segmentation accuracy

| Method | Sample plot | Match/% | Close match/% | Loss/% | Under-segmentation /% | Over-segmentation /% | Total/% |
|---|---|---|---|---|---|---|---|
| Improved watershed algorithm | 1 | 27.66% | 10.64% | 14.89% | 44.68% | 2.13% | 100% |
|  | 2 | 13.21% | 5.66% | 18.87% | 58.49% | 3.77% | 100% |
|  | Extraction accuracy: 28.58% | | | | | | |
| Method of the present disclosure | 1 | 55.32% | 19.15% | 10.64% | 10.64% | 4.26% | 100% |
|  | 2 | 58.49% | 16.98% | 5.66% | 15.09% | 3.77% | 100% |
|  | Extraction accuracy: 74.97% | | | | | | |

The above descriptions are merely optional implementations of the present disclosure. It should be noted that a person of ordinary skill in the art may further make several improvements and modifications without departing from the principle of the present disclosure, but such improvements and modifications should be regarded as falling within the protection scope of the present disclosure.

What is claimed is:

1. A method for extracting forest parameters of a wetland with high canopy density based on a consumer-grade unmanned aerial vehicle (UAV) image, comprising:

S1: collecting image data using a consumer-grade UAV;

S2: performing georeferencing, aerial triangulation, and generation of tie points and dense point clouds on a collected UAV image, and generating a digital surface model (DSM) and a digital orthophoto map (DOM);

S3: performing land use classification based on a UAV DOM image, and segmenting a bare land, a shadow; a water body, an aquatic plant and a pond cypress step by step; wherein an optimal segmentation scale is determined through an ESP2 tool, the optimal segmentation scale, a shape factor and a compactness factor are input into eCognition Developer 9.0 for multi-scale segmentation, and the bare land, the shadow, the water body, the aquatic plant and the pond cypress are segmented step by step through a threshold segmentation tool according to a brightness, a red band and a vegetation index, wherein a specific implementation process is as follows:

the DOM is loaded into the eCognition Developer 9.0, the optimal segmentation scale is determined through the ESP 2 tool, and the optimal segmentation scale is 71 when the shape factor is 0.4 and the compactness factor is 0.5; according to spectral characteristics of different land types, the bare land, the shadow, the water body, the aquatic plant and the pond cypress are segmented step by step through the threshold segmentation tool according to the brightness, the red band and the vegetation index, and a land use map is generated; and accuracy of a classification result is verified through an Arcgis 10.5, wherein 200 points are randomly generated in the Arcgis 10.5 to visually interpret the classification result, and the accuracy is verified with an object-oriented classification result by means of a confusion matrix;

S4: based on classification of different land types of the wetland, extracting a median of elevation points in a region, thinning the elevation points, regenerating a digital terrain model (DTM) of the wetland, obtaining a canopy height model (CHM) with an accurate elevation by subtracting the digital terrain model (DTM) from the digital surface model (DSM), and obtaining an accurate tree height and a tree number by means of a neighborhood algorithm through the canopy height model (CHM); and S5: processing the digital orthophoto map (DOM) by bilateral filtering, fusing foreground markers by superposing tree vertices obtained from the canopy height model (CHM), introducing the foreground markers into a watershed algorithm considering objects overlapping each other, to segment the objects, exporting a segmentation boundary, and obtaining an accurate crown range; and calculating a canopy area through the Arcgis 10.5, and verifying accuracy against a traditional marker watershed algorithm and an improved marker watershed algorithm; wherein a multi-foreground marker watershed algorithm based on color image bilateral filtering is run by means of Matlab 2018b as follows:

(1) a tif file is loaded, a tif image file and geographic information are read, tif geographic information is read, and a number of rows and a number of columns in tif are read;

(2) the DOM image is processed through color image bilateral filtering based on a Gaussian kernel, to remove a leaf shadow, retain a leaf color, and enhance a difference between tree edges, and after gray transformation, a foreground marker A is made by means of morphological opening operation, erosion and reconstruction algorithms;

(3) a tree vertex image is processed by a morphological algorithm, and a foreground marker B is made, wherein implementation steps are as follows:

an elevation marker file is loaded and read, elevation points are dilated circularly, and elevation foreground marking is performed;

(4) an image of the foreground marker A and an image of the foreground marker B are fused, wherein image superposition is performed, and saw teeth and noises in edges of a marker image are removed through the morphological erosion algorithm;

(5) marker watershed segmentation is performed on a fused image, and peripheries of segmented objects are set to overlap to each other, wherein a background marker is calculated, and a marker-controlled watershed algorithm with pixels connected is used;

the watershed algorithm regards a value of a gray-scale image as a height, and the image is segmented through a principle of collecting water in basin; external information is introduced to limit over-segmentation of images, that is, the marker-controlled watershed algorithm; and the marker image is formed by fusing a tree top and a crown range, the over-segmentation is controlled, and as for crown overlapping, pixels are connected in vertical, horizontal and diagonal directions; and (6) subtracting a range of non-tree land types from the segmentation boundary, to output a crown segmentation boundary, wherein segmentation boundary assignment is performed, a storage location and a storage name of a watershed image are determined, and the watershed image is stored.

2. The method according to claim 1, wherein in S1, a consumer-grade UAV DJI Mavic2 zoom is used to obtain the image data, and images with three visible light bands of red, green and blue are obtained; a route of the UAV is planned by means of DJI PILOT, and a mapping method combining fixed route photography and video is used.

3. The method according to claim 1, wherein in S4, a non-vegetation land type is extracted to generate a region of interest (ROI), the elevation points of the digital surface model (DSM) are extracted with a non-vegetation ROI and are thinned in Arcgis 10.5 to generate a triangulated irregular network (TIN), terrain raster data, that is, the digital terrain model (DTM) is exported, the canopy height model (CHM) is obtained by subtracting the digital terrain model (DTM) from the digital surface model (DSM) by means of a raster calculator, and the tree vertices are extracted by means of a neighborhood analysis tool.

4. The method according to claim 1, wherein accuracy of crown segmentation is evaluated through a general evaluation method, and segmented crowns have five situations: match, close match, loss, under-segmentation, and over-segmentation.

* * * * *